(12) United States Patent
Hatanaka et al.

(10) Patent No.: US 9,892,817 B2
(45) Date of Patent: Feb. 13, 2018

(54) CONDUCTIVE COMPOSITION, AND CONDUCTIVE COMPLEX

(75) Inventors: Tatsuya Hatanaka, Funabashi (JP); Masahiro Hida, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 329 days.

(21) Appl. No.: 14/119,701

(22) PCT Filed: May 25, 2012

(86) PCT No.: PCT/JP2012/063453
§ 371 (c)(1),
(2), (4) Date: Nov. 22, 2013

(87) PCT Pub. No.: WO2012/161306
PCT Pub. Date: Nov. 29, 2012

(65) Prior Publication Data
US 2014/0183419 A1 Jul. 3, 2014

(30) Foreign Application Priority Data
May 25, 2011 (JP) ................. 2011-117263

(51) Int. Cl.
| | | |
|---|---|---|
| H01B 1/04 | (2006.01) |
| H01B 1/24 | (2006.01) |
| C08K 3/04 | (2006.01) |
| B82Y 30/00 | (2011.01) |
| B82Y 40/00 | (2011.01) |
| C09D 201/00 | (2006.01) |
| C08L 101/00 | (2006.01) |
| C08G 12/08 | (2006.01) |
| C09D 161/22 | (2006.01) |
| C09D 179/08 | (2006.01) |
| C08G 73/02 | (2006.01) |
| C01B 32/05 | (2017.01) |
| C01B 32/174 | (2017.01) |

(52) U.S. Cl.
CPC ............ *H01B 1/24* (2013.01); *B82Y 30/00* (2013.01); *B82Y 40/00* (2013.01); *C01B 32/05* (2017.08); *C01B 32/174* (2017.08); *C08G 12/08* (2013.01); *C08G 73/026* (2013.01); *C08K 3/04* (2013.01); *C08L 101/005* (2013.01); *C09D 161/22* (2013.01); *C09D 179/08* (2013.01); *C09D 201/005* (2013.01); *C08G 2261/3162* (2013.01); *C08G 2261/792* (2013.01); *Y10S 977/742* (2013.01)

(58) Field of Classification Search
CPC ........ H01B 1/04; H01B 1/24; C01B 31/0273; C08K 5/42; C08G 2261/3162
USPC .................. 252/500–511; 977/742; 564/434
See application file for complete search history.

(56) References Cited

U.S. PATENT DOCUMENTS

| | | |
|---|---|---|
| 3,474,054 A | 10/1969 | White |
| 4,200,729 A | 4/1980 | Calbo |
| 4,251,665 A | 2/1981 | Calbo |
| 5,187,019 A | 2/1993 | Calbo et al. |
| 6,576,341 B1 | 6/2003 | Davey et al. |
| 7,682,590 B2 | 3/2010 | Sakakibara et al. |
| 2007/0082965 A1* | 4/2007 | Yasuda et al. .............. 522/15 |
| 2007/0213450 A1* | 9/2007 | Winey et al. ............ 524/495 |
| 2008/0038648 A1* | 2/2008 | Bender ............. G03G 5/0436 430/58.05 |
| 2008/0153991 A1* | 6/2008 | Park et al. ................ 525/409 |
| 2010/0133483 A1 | 6/2010 | Nakashima et al. |
| 2010/0136343 A1 | 6/2010 | Chang et al. |
| 2011/0294013 A1* | 12/2011 | Bosnyak et al. ........... 429/231.1 |
| 2012/0077345 A1 | 3/2012 | Saito et al. |
| 2012/0164433 A1* | 6/2012 | Advincula ............ B82Y 30/00 428/327 |
| 2012/0268840 A1* | 10/2012 | Hida et al. ................ 359/885 |
| 2014/0083752 A1* | 3/2014 | Walczak et al. .......... 174/257 |

FOREIGN PATENT DOCUMENTS

| | | |
|---|---|---|
| JP | 10-302963 A | 11/1998 |
| JP | 2000-44216 A | 2/2000 |
| JP | 2001-255566 A | 9/2001 |
| JP | 2005-162877 A | 6/2005 |
| JP | 2007-56125 A | 3/2007 |
| JP | 2008-24522 A | 2/2008 |
| JP | 2009-227934 A | 10/2009 |
| JP | 2009-242145 A | 10/2009 |
| JP | 2010-163568 A | 7/2010 |
| JP | 2010-163570 A | 7/2010 |
| WO | WO 2008/139839 A1 | 11/2008 |
| WO | 2010-509428 A | 3/2010 |
| WO | WO 2010/147155 A1 | 12/2010 |
| WO | WO 2011/065395 A1 | 6/2011 |

OTHER PUBLICATIONS

Lou ("Synthesis of Pyrene-Containing Polymers and Noncovalent Sidewall Functionalization of Multiwalled Carbon Nanotubes." Chem Mater, 16, pp. 4005-4011, Web Sep. 25, 2004).*
International Search Report issued in PCT/JP2012/063453 dated Aug. 7, 2012.
Dettlaff-Weglikowska et al., "Effect of SOCl2 Treatment on Electrical and Mechanical Properties of Singled-Wall Carbon Nanotube Networks", J. Am. Chem. Soc., 2005, vol. 127, No. 14, p. 5125-5131.
Extended European Search Report, dated Aug. 7, 2015, for European Application No. 12790303.7.

(Continued)

*Primary Examiner* — Tri V Nguyen
(74) *Attorney, Agent, or Firm* — Birch, Stewart, Kolasch & Birch, LLP

(57) ABSTRACT

A conductive composition containing carbon nanotubes, a carbon nanotube dispersant, and a dopant precursor, wherein the dispersant is a non-conjugated polymer compound having an aromatic ring as the repeating unit, and the dopant precursor is an acid-generating agent which generates cation by being subjected to light and/or heat. The aforementioned conductive composition is capable of stably dispersing carbon nanotubes and of efficiently doping same without damaging the conductive properties of the carbon nanotubes.

8 Claims, No Drawings

(56) References Cited

OTHER PUBLICATIONS

International Search Report, issued in PCT/JP2012/063454, dated Aug. 28, 2012.
Lee et al., "Conductivity enhancement in single-walled carbon nanotube bundles doped with K and Br", Nature, Jul. 17, 1997, vol. 388 (6639), p. 255-257.

* cited by examiner

CONDUCTIVE COMPOSITION, AND CONDUCTIVE COMPLEX

TECHNICAL FIELD

The present invention relates to an electrically conductive composition and an electrically conductive composite.

BACKGROUND ART

Carbon nanotubes (abbreviated below as "CNTs") are structures that can be counted on to have a high electrical conductivity, and are being studied for potential use in a wide range of fields as a key nanotechnology material.

In the actual use of such CNTs, to achieve a high conductivity in a smaller amount, the CNTs must be uniformly dispersed within a polymer or the like that serves as a matrix material.

Dispersion methods can be broadly divided into methods that involve modifying the carbon nanotubes themselves so that they easily disperse in the matrix material, and methods that involve the use of a dispersant such as a surfactant or a polymer.

Of these, methods involving the use of a dispersant are commonly employed because the carbon nanotubes can be uniformly and highly dispersed while retaining their electrical conductivity.

Various dispersants, ranging from small molecules to polymers, are being investigated, although small-molecule dispersants generally have a low dispersibility and a poor heat resistance.

On the other hand, because polymeric dispersants have a low solubility, ionic functional groups often are deliberately introduced onto the molecule. Moreover, many such dispersants have aromatic rings in order to increase interactions with the CNTs.

Techniques for introducing functional groups onto CNTs themselves by chemical treatment, heat treatment or the like are being attempted, although this leads to new problems such as fragmentation of the CNTs and a decline in the electrical conductivity due to breakup of the conjugated system.

From another perspective in dispersant development, additional categories of CNTs dispersants include conjugated dispersants such as conductive polymers, and insulating non-conjugated dispersants.

When a conductive polymer is used, the conductivity properties of the resulting composition are improved, but this is accompanied by drawbacks; namely, a decrease in transparency due to light absorption by the dispersant, and the color tone.

On the other hand, in the case of non-conjugated dispersants, because these are insulators themselves, the dispersant is a factor that increases the contact resistance of the CNTs, preventing the conductive properties inherent to the CNTs from being fully manifested.

It is also known that doping CNTs with an inorganic acid, an organic acid, thionyl chloride or the like increases the conductivity of the CNTs (see, for example, Patent Document 1).

Yet, when such dopants are added to a CNT dispersion, the dispersed state of the CNTs sometimes becomes unstable due to changes in the pH of the dispersion or to interactions by the dopant with the CNTs, the dispersant and the dispersion medium.

Hence, investigations are also being widely carried out on the doping of conductive compositions obtained by removing the dispersion medium from a CNT dispersion.

However, in such cases, in addition to the problem that dopant does not fully penetrate to the interior, further drawbacks include an increase in the costs associated with the process, and the desire for a high chemical stability in the base material used because of a high reactivity of dopants.

PRIOR ART DOCUMENTS

Patent Documents

Patent Document 1: JP-A 2010-163568
Patent Document 2: JP-A 2007-56125

SUMMARY OF THE INVENTION

Problems to be Solved by the Invention

It is therefore an object of the present invention to provide an electrically conductive composition in which carbon nanotubes are stably dispersed without impairing the electrically conductive properties of the carbon nanotubes and which can be efficiently doped. A further object of the invention is to provide an electrically conductive composite obtained from such an electrically conductive composition.

Means for Solving the Problems

The inventors have conducted extensive investigations, as a result of which they have found that an electrically conductive composition obtained by adding a neutral acid generator as a dopant precursor to a composition containing carbon nanotubes and a non-conjugated dispersant has an excellent carbon nanotube dispersion stability. In addition, they have found that, during and/or after film formation by a process such as the coating of this composition, by carrying out doping treatment that involves generating an acid from the dopant precursor by an external stimulus, a composite having an excellent electrical conductivity can be obtained.

Patent Document 2 discloses a composition which includes carbon nanotubes, a siloxane compound and an acid generator. A polymerization initiator for siloxane compounds is used as the acid generator; no mention is made of using an acid generator as a dopant precursor. Moreover, the dispersant that is used is a conjugated dispersant; it is not the non-conjugated dispersant of the inventive composition.

Accordingly, the invention provides:

1. An electrically conductive composition characterized by comprising carbon nanotubes, a carbon nanotube dispersant and a dopant precursor, wherein the dispersant is a non-conjugated polymer compound containing an aromatic ring as the repeating unit and the dopant precursor is an acid generator which generates cations under the influence of light and/or heat;
2. The electrically conductive composition according to 1 above, wherein the polymer compound has a polystyrene-equivalent weight-average molecular weight, as measured by gel permeation chromatography, of from 1,000 to 2,000,000;
3. The electrically conductive composition according to 1 or 2 above, wherein the polymer compound is a polymer compound having an arylamine skeleton as the repeating unit;

4. The electrically conductive composition according to 3 above, wherein the polymer compound is a highly branched polymer having a triarylamine skeleton as the repeating unit;

5. The electrically conductive composition according to 4 above, wherein the highly branched polymer has repeating units of formula (1) or formula (2) below

[Chemical Formula 1]

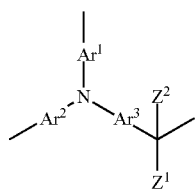
(1)

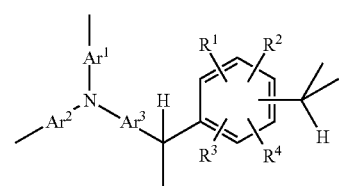
(2)

(wherein $Ar^1$ to $Ar^3$ are each independently a divalent organic group of any one of formulas (3) to (7) below

[Chemical Formula 2]

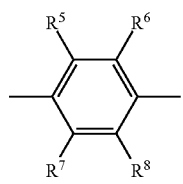
(3)

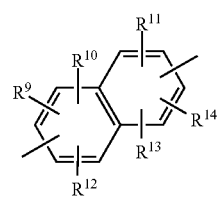
(4)

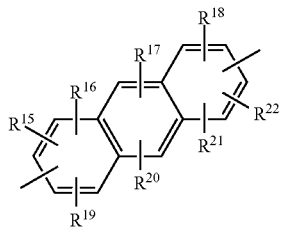
(5)

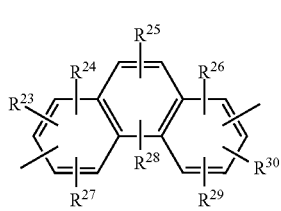
(6)

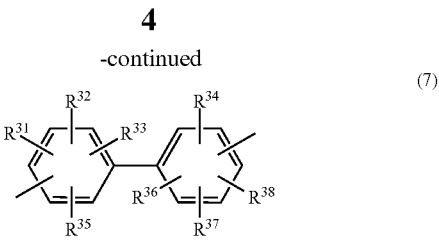
(7)

(in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof); $Z^1$ and $Z^2$ are each independently a hydrogen atom, an alkyl group of 1 to 5 carbons which may have a branched structure, or a monovalent organic group of any one of formulas (8) to (11) below

[Chemical Formula 3]

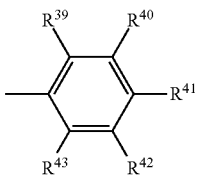
(8)

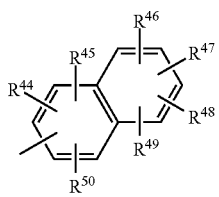
(9)

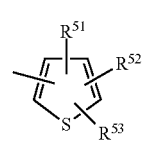
(10)

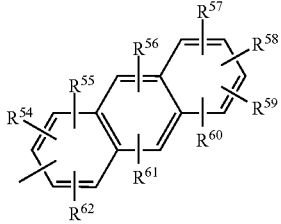
(11)

(in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $COOR^{63}$, $NR^{63}R^{64}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof)), with the proviso that $Z^1$ and $Z^2$ are not both alkyl groups; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof);

6. The electrically conductive composition according to any one of 1 to 5 above, which further comprises an organic solvent;
7. An electrically conductive composite obtained from the conductive composition according to any one of 1 to 6 above;
8. The electrically conductive composite of 7 above which is a thin-film; and
9. A method of producing an electrically conductive composite, the method being characterized by the step of subjecting the electrically conductive composition of any one of 1 to 6 above to light irradiation and/or heat application.

Advantageous Effects of the Invention

Because the conductive composition of the invention includes a neutral acid generator as the dopant precursor, pH changes in the composition are suppressed. Moreover, interactions by the precursor with the CNTs and the dispersant are weak, enabling the dispersed state of the CNTs to be stably maintained.

Moreover, because the dopant precursor is capable of generating an acid under an external stimulus, not only is it possible to increase the electrical conductivity of a composite obtained by doping treatment using this acid, doping control from the standpoint of process design is easily carried out, in addition to which the effects of doping treatment upon the base material can be greatly reduced, making it possible to use a diversity of base materials.

Also, the conductive composition of the invention can easily be formed into a thin-film merely by coating onto a base material. Furthermore, because the resulting thin-film exhibits a high electrical conductivity as mentioned above, it can be advantageously used in a broad range of applications as, for example, various types of electrically conductive materials.

EMBODIMENT FOR CARRYING OUT THE INVENTION

The invention is described more fully below.

The conductive composition of the invention includes carbon nanotubes, a carbon nanotube dispersant and a dopant precursor. The dispersant is a non-conjugated polymer compound containing an aromatic ring as the repeating unit, and the dopant precursor is an acid generator which generates cations under the influence of light and/or heat.

The carbon nanotubes (CNTs) here are produced by, for example, an arc discharge process, chemical vapor deposition (CVD) or laser ablation. The CNTs used in this invention may be obtained by any of these methods. CNTs are categorized as single-walled CNTs composed of a single cylindrically rolled graphene sheet (abbreviated below as "SWCNTs"), double-walled CNTs composed of two concentrically rolled graphene sheets (abbreviated below as "DWCNTs"), and multi-walled CNTs composed of a plurality of concentrically rolled graphene sheets (abbreviated below as "MWCNTs"). In this invention, SWCNTs, DWCNTs and MWCNTs may each be used alone or a plurality of these types of CNTs may be used in combination.

When synthesizing SWCNTs, DWCNTs and MWCNTs by the above methods, fullerene, graphite and amorphous carbon form at the same time as by-products, in addition to which catalyst metals such as nickel, iron, cobalt and yttrium remain present. The removal of these impurities and purification is thus sometimes necessary. Acid treatment with nitric acid, sulfuric acid or the like in combination with ultrasonication is effective for removing impurities. In acid treatment with nitric acid, sulfuric acid or the like, the $\pi$ conjugated system making up the CNTs may be destroyed, resulting in a loss of the inherent properties of the CNTs. Hence, it is desirable to purify and use the CNTs under suitable conditions.

The dispersant used is a polymer compound having as the repeating unit an aromatic ring which, owing both to $\pi$-$\pi$ interactions with CNTs and to entanglement with CNTs on account of van der Waals forces and the steric conformation, exhibits excellent dispersion properties, and having a non-conjugated molecular chain which imparts to the resulting conductive composite a good light transmittance.

Also, in order to increase the CNT dispersibility, it is desirable for the polymer compound used as the dispersant to have no ionic functional groups such as carboxyl groups and sulfo groups.

The average molecular weight of the polymer compound is not particularly limited, although the weight-average molecular weight is preferably from 1,000 to 2,000,000. If the polymer compound has a weight-average molecular weight below 1,000, there is a risk that the CNT dispersibility will markedly decrease or that dispersibility may cease to be exhibited. On the other hand, at a weight-average molecular weight greater than 2,000,000, handling of the polymer compound in dispersion treatment may become very difficult. A polymer compound having a weight-average molecular weight of from 2,000 to 1,000,000 is more preferred.

The weight-average molecular weight of the invention is a measured value (polystyrene equivalent) obtained by gel permeation chromatography.

No particular limitation is imposed on the polymer compound, although a polymer compound having an arylamine skeleton as the repeating unit is preferred. Owing to the excellent CNT dispersibility, a highly branched polymer having a triarylamine skeleton as the repeating unit is more lo preferred, and a highly branched polymer obtained by condensation polymerizing a triarylamine compound with an aldehyde compound and/or a ketone compound in the presence of an acid catalyst is even more preferred.

More specifically, a highly branched polymer of above formula (1) or (2) containing a triarylamine skeleton as the branch points is preferred.

In above formulas (1) and (2), $Ar^1$ to $Ar^3$ are each independently a divalent organic group of any one of above formulas (3) to (7), although a substituted or unsubstituted phenylene group of formula (3) is preferred, and a phenylene group in which $R^5$ to $R^8$ are all hydrogen atoms is more preferred.

In above formulas (2) to (7), $R^1$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof.

Here, examples of the halogen atom include fluorine, chlorine, bromine and iodine atoms.

Examples of the alkyl group of 1 to 5 carbons which may have a branched structure include methyl, ethyl, n-propyl, isopropyl, n-butyl, sec-butyl, tert-butyl and n-pentyl.

Examples of the alkoxy group of 1 to 5 carbons which may have a branched structure include methoxy, ethoxy, n-propoxy, isopropoxy, n-butoxy, sec-butoxy, tert-butoxy and n-pentoxy.

Salts of carboxyl groups, sulfo groups, phosphoric acid groups and phosphonic acid groups include sodium, potassium and other alkali metal salts; magnesium, calcium and other alkaline earth metal salts; ammonium salts; propylamine, dimethylamine, tri-$C_{1-10}$ alkylamine (e.g., triethylamine, tri-n-propylamine, tri-n-butylamine, tri-n-pentylamine, tri-n-hexylamine, tri-n-heptylamine, tri-n-octylamine, tri-n-nonylamine, tri-n-decylamine), ethylenediamine and other aliphatic amine salts; imidazoline, piperazine, morpholine and other cyclic amine salts; aniline, diphenylamine and other aromatic amine salts; and pyridinium salts.

In above formulas (1) and (2), $Z^1$ and $Z^2$ are each independently a hydrogen atom, an alkyl group of 1 to 5 carbons which may have a branched structure, or a monovalent organic group of any of above formulas (8) to (11), with the proviso that $Z^1$ and $Z^2$ are not both alkyl groups. It is preferable for $Z^1$ and $Z^2$ to be each independently a hydrogen atom, a 2- or 3-thienyl group, or a group of formula (8') below. It is more preferable for one of $Z^1$ and $Z^2$ to be a hydrogen atom and for the other to be a hydrogen atom, a 2- or 3-thienyl group or a group of formula (8') below, with a 4-biphenyl group in which $R^{41}$ is a phenyl group and a 4-methoxyphenyl group in which $R^{41}$ is a methoxy group being especially preferred.

The alkyl group of 1 to 5 carbons which may have a branched structure is exemplified by the same groups as mentioned above.

[Chemical Formula 4]

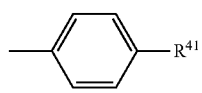

(8')

In above formulas (8) to (11) and (8'), $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $COOR^{63}$, $NR^{63}R^{64}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof.

Here, the haloalkyl group of 1 to 5 carbons which may have a branched structure is exemplified by difluoromethyl, trifluoromethyl, bromodifluoromethyl, 2-chloroethyl, 2-bromoethyl, 1,1-difluoroethyl, 2,2,2-trifluoroethyl, 1,1,2,2-tetrafluoroethyl, 2-chloro-1-1-2-trifluoroethyl, pentafluoroethyl, 3-bromopropyl, 2,2,3,3-tetrafluoropropyl, 1,1,2,3,3,3-hexafluoropropyl, 1,1,1,3,3,3-hexafluoropropan-2-yl, 3-bromo-2-methylpropyl, 4-bromobutyl and perfluoropentyl.

The halogen atom, alkyl group of 1 to 5 carbons which may have a branched structure, and carboxyl group, sulfo group, phosphoric acid group, phosphonic acid group or salt of any thereof are exemplified by the same groups as mentioned for above formulas (2) to (7).

The highly branched polymer is obtained, as shown in Scheme 1 below, by the condensation polymerization, in the presence of an acid catalyst, of a triarylamine compound such as one of formula (A) below that is capable of furnishing the aforementioned triarylamine skeleton with an aldehyde compound and/or a ketone compound such as one of formula (B) below.

In cases where a difunctional compound (C) such as a phthaldehyde (e.g., terephthaldehyde) is used as the aldehyde compound, not only does the reaction shown in Scheme 1 arise, the reaction shown in Scheme 2 below also arises, giving a highly branched polymer having a crosslinked structure in which the two functional groups both contribute to the condensation reaction.

Scheme 1

[Chemical Formula 5]

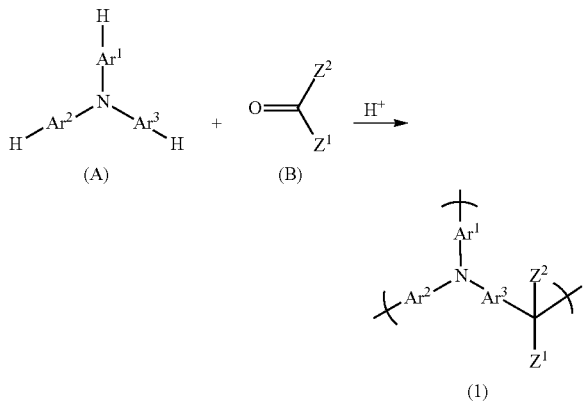

(wherein $Ar^1$ to $Ar^3$ and both $Z^1$ and $Z^2$ are the same as defined above)

Scheme 2

[Chemical Formula 6]

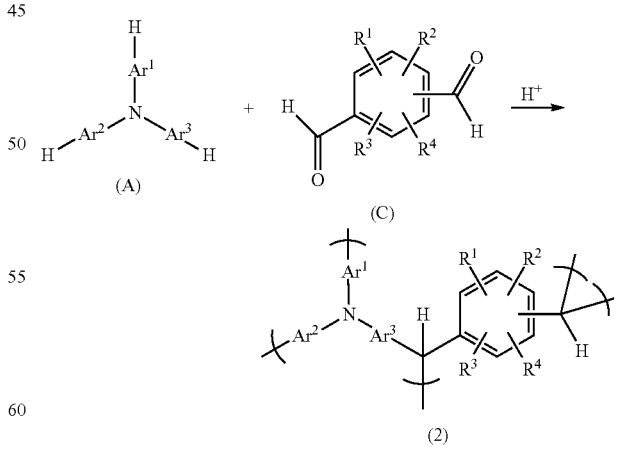

(wherein $Ar^1$ to $Ar^3$ and $R^1$ to $R^4$ are the same as defined above)

Illustrative examples of the aldehyde compound which may be used to produce the highly branched polymer include saturated aliphatic aldehydes such as formaldehyde, paraformaldehyde, acetaldehyde, propionaldehyde, butyraldehyde, isobutyraldehyde, valeraldehyde, capronaldehyde, 2-methylbutyraldehyde, hexanal, undecanal, 7-methoxy-3,7-dimethyloctanal, cyclohexanal, 3-methyl-2-butyraldehyde, glyoxal, malonaldehyde, succinaldehyde, glutaraldehyde and adipaldehyde; unsaturated aliphatic aldehydes such as acrolein and methacrolein; heterocyclic aldehydes such as furfural, pyridine aldehyde and thiophene aldehyde; and aromatic aldehydes such as benzaldehyde, tolylaldehyde, trifluoromethylbenzaldehyde, phenylbenzaldehyde, salicylaldehyde, anisaldehyde, acetoxybenzaldehyde, terephthaldehyde, acetylbenzaldehyde, formylbenzoic acid, methyl formylbenzoate, aminobenzaldehyde, N,N-dimethylaminobenzaldehyde, N,N-diphenylaminobenzaldehyde, naphthaldehyde, anthraldehyde, phenanthraldehyde, phenylacetaldehyde and 3-phenylpropionaldehyde. The use of an aromatic aldehyde is especially preferred.

The ketone compound is exemplified by alkyl aryl ketones and diaryl ketones, illustrative examples of which include acetophenone, propiophenone, diphenyl ketone, phenyl naphthyl ketone, dinaphthyl ketone, phenyl tolyl ketone and ditolyl ketone.

In the condensation polymerization reaction, the aldehyde compound and/or the ketone compound may be used in a ratio of from 0.1 to 10 equivalents per equivalent of aryl groups on the triarylamine compound.

The acid catalyst used may be, for example, a mineral acid such as sulfuric acid, phosphoric acid or perchloric acid; an organic sulfonic acid such as p-toluenesulfonic acid or p-toluenesulfonic acid monohydrate; or a carboxylic acid such as formic acid or oxalic acid.

The amount of acid catalyst used, although variously selected according to the type of acid catalyst, is generally from 0.001 to 10,000 parts by weight, preferably from 0.01 to 1,000 parts by weight, and more preferably from 0.1 to 100 parts by weight, per 100 parts by weight of the triarylamine.

The condensation reaction may be carried out without a solvent, although it is generally carried out using a solvent. Any solvent that does not hinder the reaction may be used for this purpose. Illustrative examples include cyclic ethers such as tetrahydrofuran and 1,4-dioxane; amides such as N,N-dimethylformamide (DMF), N,N-dimethylacetamide (DMAc) and N-methyl-2-pyrrolidone (NMP); ketones such as methyl isobutyl ketone and cyclohexanone; halogenated hydrocarbons such as methylene chloride, chloroform, 1,2-dichloroethane and chlorobenzene; and aromatic hydrocarbons such as benzene, toluene and xylene. These solvents may be used singly, or two or more may be used in admixture. Cyclic ethers are especially preferred.

If the acid catalyst used is a liquid compound such as formic acid, the acid catalyst may also fulfill the role of a solvent.

The reaction temperature during condensation is generally from 40 to 200° C. The reaction time may be variously selected according to the reaction temperature, but is generally from about 30 minutes to about 50 hours.

The weight-average molecular weight Mw of the polymer obtained as described above is generally from 1,000 to 2,000,000, and preferably from 2,000 to 1,000,000.

The conductive composition of the invention includes as the dopant precursor an acid generator which generates a cation under the influence of light and/or heat.

So long as the acid generator is a substance which generates an acid under an external stimulus, it is not limited and may be a polymer compound or a low-molecular-weight compound.

The photoacid generator used may be one that is suitably selected from among known photoacid generators that generate a cation under the influence of light. For example, use may be made of onium salt derivatives such as diazonium salts, sulfonium salts and iodonium salts.

Illustrative examples include aryldiazonium salts such as phenyldiazonium hexafluorophosphate, 4-methoxyphenyldiazonium hexafluoroantimonate, and 4-methylphenyldiazonium hexafluorophosphate; diaryliodonium salts such as diphenyliodonium hexafluoroantimonate, di(4-methylphenyl)iodonium hexafluorophosphate, and di(4-tert-butylphenyl)iodonium hexafluorophosphate; and triarylsulfonium salts such as triphenylsulfonium hexafluoroantimonate, tris(4-methoxyphenyl)sulfonium hexafluorophosphate, diphenyl(4-thiophenoxyphenyl)sulfonium hexafluoroantimonate, diphenyl(4-thiophenoxyphenyl)sulfonium hexafluorophosphate, 4,4'-bis(diphenylsulfonio)phenylsulfide bishexafluoroantimonate, 4,4'-bis(diphenylsulfonio)phenylsulfide bishexafluorophosphate, 4,4'-bis[di($\beta$-hydroxyethoxy)phenylsulfonio]phenylsulfide bishexafluoroantimonate, 4,4'-bis[di($\beta$-hydroxyethoxy)phenylsulfonio]phenylsulfide bishexafluorophosphate, 4-[4'-(benzoyl)phenylthio]phenyl[di(4-fluorophenyl)]sulfonium hexafluoroantimonate and 4'[4'-(benzoyl)phenylthio]phenyl[di(4-fluorophenyl)]sulfonium hexafluorophosphate.

Commercial products may be used as these onium salts. Illustrative examples include SAN-AID SI-60, SI-80, SI-100, SI-60L, SI-80L, SI-100L, SI-L145, SI-L150, SI-L160, SI-L110 and SI-L147 (all available from Sanshin Chemical Industry Co., Ltd.); UVI-6950, UVI-6970, UVI-6974, UVI-6990 and UVI-6992 (all available from Union Carbide); CPI-100P, CPI-100A, CPI-101A, CPI-200K and CPI-200S (all available from San-Apro Ltd.); Adeka Optomer SP-150, SP-151, SP-170 and SP-171 (all available from Adeka Corporation); Irgacure 261 (available from BASF); CI-2481, CI-2624, CI-2639 and CI-2064 (all available from Nippon Soda Co., Ltd.); CD-1010, CD-1011 and CD-1012 (all available from Sartomer Company, Inc.); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103 and BBI-109 (all available from Midori Kagaku Co., Ltd.); PCI-061T, PCI-062T, PCI-020T and PCI-022T (all available from Nippon Kayaku Co., Ltd.); IBPF and IBCF (all available from Sanwa Chemical Co., Ltd.); and PI2074 (available from Rhodia Japan, Ltd.).

The photoacid generators described above may be used singly or two or more may be used in combination.

A known thermal acid generator may be suitably selected and used as the thermal acid generator which generates a cation under the influence of heat. For example, use may be made of triarylsulfonium salts, dialkylarylsulfonium salts and diarylalkylsulfonium salts of strong non-nucleophilic acids; alkylaryliodonium salts and diaryliodonium salts of strong non-nucleophilic acids; and ammonium, alkylammonium, dialkylammonioum, trialkylammonium and tetralkylammonium salts of strong non-nucleophilic acids.

Moreover, covalent thermal acid generators may be used. Examples include 2-nitrobenzyl esters of alkyl or arylsulfonic acids, and other esters of sulfonic acids which decompose under the influence of heat to give free sulfonic acid.

Illustrative examples include diaryliodonium perfluoroalkylsulfonate, diaryliodonium tris(fluoroalkylsulfonyl)methide, diaryliodonium bis(fluoroalkylsulfonyl)methide, diaryliodonium bis(fluoroalkylsulfonyl)imide, and diaryliodonium quaternary ammonium perfuoroalkylsulfonate; benzenetosylates such as 2-nitrobenzyl tosylate, 2,4-dinitrobenzyl tosylate, 2,6-dinitrobenzyl tosylate and 4-nitrobenzyl tosylate; benzenesulfonates such as cyclohexyl p-toluenesulfonate, 2-trifluoromethyl-6-nitrobenzyl 4-chlorobenzenesulfonate and 2-trifluoromethyl-6-nitrobenzyl 4-nitrobenzenesulfonate; phenolic sulfonate esters such as phenyl 4-methoxybenzenesulfonate; quaternary ammonium tris(fluoroalkylsulfonyl)methide; quaternary alkyl ammonium bis(fluoroalkylsulfonyl)imide; and the triethylammonium salt of 10-camphorsulfonic acid.

In addition, various amine salts of aromatic (anthracene, naphthalene, or a benzene derivative) sulfonic acids may be used. Specific examples include the amine salts of sulfonic acids mentioned in U.S. Pat. Nos. 3,474,054, 4,200,729, 4,251,665 and 5,187,019.

The thermal acid generators described above may be used singly or two or more may be used in combination.

The inventive composition may additionally include an organic solvent having the ability to dissolve the above dispersant.

Illustrative examples of such organic solvents include ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; and aromatic hydrocarbons such as benzene, toluene, xylene and ethylbenzene. These organic solvents may be used singly or two or more may be used in combination.

In particular, from the standpoint of being able to increase the proportion of individually dispersed CNTs, the use of NMP, DMF, THF or isopropanol is preferred. It is desirable to also include, as an additive for enhancing the film formability of the composition, a small amount of a glycol ether such as ethylene glycol monoethyl ether, ethylene glycol monobutyl ether or propylene glycol monomethyl ether, or a ketone such as acetone, methyl ethyl ketone or cyclohexanone.

Any suitable method may be used to prepare the conductive composition of the invention. In cases where the dispersant is a liquid, the composition may be prepared by suitably mixing the dispersant with the CNTs and the dopant precursor. In cases where the dispersant is a solid, the composition may be prepared by melting the dispersant, then mixing it with the CNTs and the dopant precursor.

In cases where an organic solvent is used, the composition may be prepared by mixing together the dispersant, the CNTs, the dopant precursor and an organic solvent in any order.

The mixture of the dispersant, CNTs, dopant precursor and organic solvent is preferably subjected to dispersion treatment; with such treatment the proportion of individually dispersed CNTs can be increased. Examples of dispersion treatment include the following types of mechanical treatment: wet treatment using a ball mill, bead mill or jet mill, and ultrasonic treatment using a bath-type or probe-type sonicator.

Any suitable dispersion treatment time may be used, although a time of from about 1 minute to about 10 hours is preferred, and a time of from about 5 minutes to about 5 hours is more preferred.

Because highly branched polymer-based dispersants have an excellent CNT dispersibility, even if heat treatment is not carried out before dispersion treatment, it is possible to obtain a composition in which the CNTs have been individually dispersed to a high concentration. However, heat treatment may be carried out if necessary.

Following dispersion treatment, centrifugal separation may also be carried out. Because such centrifugal separation causes undispersed CNTs, excess dispersant and impurities present in the CNTs to precipitate, the CNTs dispersed within the composition can be collected by recovering the centrifugal supernatant.

This treatment makes it possible to prevent the re-aggregation of CNTs and further enhances the stability of the composition.

The centrifugal force during centrifugal separation is not particularly limited, and may be suitably set to from 100 g to 2,000,000 g.

The mixing ratio of dispersant and CNTs in the conductive composition of the invention may be set to from about 1,000:1 to about 1:100, by weight.

The concentration of dispersant in a composition which uses an organic solvent is not particularly limited, provided it is a concentration that enables the CNTs to be dispersed in the organic solvent. However, in this invention, the concentration in the composition is set to preferably from about 0.001 to about 30 wt %, and more preferably from about 0.002 to about 20 wt %.

In addition, the CNT concentration in the composition is not particularly limited, provided at least some of the CNTs are individually dispersed. However, in this invention, the CNT concentration in the composition is set to preferably from about 0.0001 to about 20 wt %, and more preferably from about 0.001 to about 10 wt %.

The amount of dopant precursor included is not particularly limited, although to have the composition exhibit an adequate doping effect, the mixing ratio with CNT, expressed as CNT:dopant precursor, is set to preferably from about 10,000:1 to about 1:10, and more preferably from about 1,000:1 to about 1:5, by weight.

In the inventive composition prepared as described above, it is assumed that the dispersant adheres to the surfaces of the CNTs to form a composite.

Alternatively, in the inventive composition, a general-purpose synthetic resin that is soluble in the above organic solvent may be mixed with the other ingredients, and the resulting mixture used to form a composite.

Illustrative examples of the general-purpose synthetic resin include the following thermoplastic resins: polyolefin resins such as polyethylene (PE), polypropylene (PP), ethylene-(vinyl acetate) copolymer (EVA) and ethylene-(ethyl acrylate) copolymer (EEA), polystyrene resins such as polystyrene (PS), high-impact polystyrene (HIPS), acrylonitrile-styrene copolymer (AS), acrylonitrile-butadiene-styrene copolymer (ABS) and (methyl methacrylate)-styrene copolymer (MS), polycarbonate resins, vinyl chloride resins, polyamide resins, polyimide resins, (meth)acrylic resins such as poly(methyl methacrylate) (PMMA), polyester resins such as poly(ethylene terephthalate) (PET), poly(butylene terephthalate), poly(ethylene naphthalate), poly(butylene naphthalate), poly(lactic acid) (PLA), poly(3-hydroxybutyric acid), polycaprolactone, poly(butylene succinate) and poly(ethylene succinate/adipate), polyphenylene ether resins, modified polyphenylene ether resins, polyacetal resins, polysulfone resins, poly(phenylene sulfide) resins, poly(vinyl alcohol) resins, poly(glycolic acid)s, modified starches, cellulose acetate and cellulose triacetate, chitin and chitosan, and lignin; and the following thermoset resins: phenolic resins, urea resins, melamine resins, unsaturated polyester resins, polyurethane resins, and epoxy resins.

The conductive composition of the invention may also include a crosslinking agent that is soluble in the above-described organic solvent.

Examples of such crosslinking agents include melamine-based crosslinking agents, substituted urea-based crosslinking agents and crosslinking agents which are polymers thereof. These crosslinking agents may be used singly, or two or more may be used in admixture. A crosslinking agent having at least two crosslink-forming substituents is preferred. Illustrative examples of such crosslinking agents include compounds such as CYMEL®, methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylated urea, methylolated urea, methoxymethylated thiourea, butoxymethylated thiourea and methylolated thiourea, as well as condensates of these compounds.

The amount of crosslinking agent added varies according to such factors as the organic solvent used, the base material used, the required viscosity, and the required lo film shape. However, the amount of addition with respect to the CNT dispersant (highly branched polymer) is typically from 0.001 to 80 wt %, preferably from 0.01 to 50 wt %, and more preferably from 0.05 to 40 wt %. Although these crosslinking agents do sometimes give rise to crosslinking reactions due to self-condensation, they elicit a crosslinking reaction with the highly branched polymer of the invention. In cases where crosslinkable substituents are present in the highly branched polymer, the crosslinking reaction is promoted by these crosslinkable substituents.

In this invention, an acidic compound such as p-toluenesulfonic acid, trifluoromethanesulfonic acid, pyridinium p-toluenesulfonic acid, salicylic acid, sulfosalicylic acid, citric acid, benzoic acid, hydroxybenzoic acid or naphthalenecarboxylic acid may be added as the catalyst for promoting the crosslinking reaction. However, from the standpoint of enhancing the dispersion properties, the use of an acid generator which generates a cation under the influence of light and/or heat is preferred. In cases where an acid generator is added as a catalyst, this may also serve as the above-described dopant precursor, or may be separate therefrom.

The amount of catalyst addition with respect to the dispersant is typically from 0.0001 to 20 wt %, preferably from 0.0005 to 10 wt %, and more preferably from 0.001 to 3 wt %.

The inventive composition may be formed into a composite by mixture and melt blending with a resin intended to serve as the matrix.

The resin that becomes the matrix is preferably a thermoplastic resin, and is exemplified by the same thermoplastic resins as are mentioned above for the general-purpose synthetic resin.

In this case, preparation of the composition typically involves melt blending the dispersant, the CNTs, dopant precursor and the resin that becomes the matrix in a blending apparatus. Exemplary blending apparatuses include various types of mixers, and single-screw or twin-screw extruders. The blending temperature and time are not particularly limited, and may be suitably selected according to the resin intended to serve as the matrix.

The CNT concentration in the composition in which a resin that is to serve as the matrix has been used will vary depending on such factors as the mechanical, electrical and thermal properties desired of the composition, and so is not particularly limited. However, in this invention, the CNT concentration in the composition is set to preferably from about 0.0001 to about 30 wt %, and more preferably from about 0.001 to about 20 wt %.

The conductive composition (solution) of the invention may be applied and formed into a film on a suitable base material such as PET, glass or ITO by a suitable method, such as spin coating, dipping, flow coating, ink-jet printing, spraying, bar coating, gravure coating, slit coating, roller coating, transfer printing, brush coating, blade coating or air knife coating.

The thin-film thus obtained can be advantageously used in electrically conductive materials that make use of the metallic qualities of CNTs, such as antistatic films and transparent electrodes, and in other applications such as photoelectric conversion elements and electroluminescence elements.

EXAMPLES

The invention is illustrated more fully below by way of Working Examples and Comparative Examples, although the invention is not limited by these Examples. The apparatuses and conditions used for preparing samples and for analyzing the properties of the samples were as follows.
(1) Gel Permeation Chromatography (GPC)
  Instrument: HLC-8200 GPC (Tosoh Corporation)
  Columns: Shodex KF-804L+KF-805L
  Column temperature: 40° C.
  Solvent: Tetrahydrofuran
  Detector: UV (254 nm)
  Calibration curve: polystyrene standard
(2) Probe-Type Ultrasonicator (dispersion treatment)
  Apparatus: UIP1000 (Hielscher Ultrasonics GmbH)
(3) Small High-Speed Refrigerated Centrifuge (centrifugal separation)
  Apparatus: SRX-201 (Tomy Seiko Co., Ltd.)
(4) Hot Plate
  Apparatus: ND-2 (As One Corporation)
(5) Airbrush
  Apparatus: Revolution HP-TR2
  (Anest Iwata Corporation)
  Nozzle Size: 0.5 mm
  Bottle Capacity: 15 mL
(6) Spot Light Source
  Apparatus: LC5 (Hamamatsu Photonics K.K.)
(7) Cumulative UV Actinometer (measurement of illuminance)
  Instrument: UIT-150 (Ushio Inc.)
(8) UV-Visible-Near IR Spectrophotometer (measurement of light absorbance)
  Instrument: SHIMADZU UV-3600
  (Shimadzu Corporation)
  Measurement Wavelength: 400 to 1650 nm
(9) Resistivity Meter (measurement of surface resistivity)
  Instrument: Loresta GP
  (Mitsubishi Chemical Corporation)
  Probe: ASP serial 4-pin probe
  (Mitsubishi Chemical Corporation; inter-pin distance, 5 mm)
(10) Haze Meter (measurement of total light transmittance)
  Instrument: NDH5000
  (Nippon Denshoku Industries Co., Ltd.)
(11) Wet Jet Mill (dispersion treatment)
  Apparatus: Nano Jet Pal® JN20 (Jokoh KK)
The meanings of abbreviations used in the examples are as follows.
  CNT-1: purified SWCNTs ("KH Single-Walled Carbon Nanotubes" from KH Chemicals; outside diameter, 1 to 1.3 nm)

CNT-2: purified SWCNTs (ASP-100F, from Hanwha Nanotech)
PTSA: p-toluenesulfonic acid monohydrate (Junsei Chemical Co., Ltd.)
CPI: CPI®-101A (from San-Apro Ltd.)
PI: PI2074 (from Rhodia Japan, Ltd.)
PTSA-CH: cyclohexyl p-toluenesulfonate (Tokyo Chemical Industry Co., Ltd.)
THF: tetrahydrofuran
NMP: N-methyl-2-pyrrolidone
CHN: cyclohexanone Synthesis Example 1

Synthesis of the Highly Branched Polymer PTPA-PBA

Under a nitrogen atmosphere, a 200 mL four-neck flask was charged with 5.0 g (20 mmol) of triphenylamine (Tokyo Chemical Industry), 7.4 g (41 mmol, 2.0 eq. relative to the triphenylamine) of 4-phenylbenzaldehyde (Mitsubishi Gas Chemical), 1.2 g (6.1 mmol, 0.3 eq. relative to the triphenylamine)) of PTSA and 10 g of 1,4-dioxane. The temperature of the mixture was raised to 100° C. under stirring, bringing about dissolution and commencing polymerization. The reaction was carried out for 45 minutes, after which the reaction mixture was allowed to cool to 60° C. The reaction mixture was then diluted with 100 g of THF and subsequently poured into a mixed solution of 250 g of acetone, 250 g of methanol and 20 g of 28 wt % ammonia water, and thereby re-precipitated. The precipitate was collected by filtration, and the resulting solid was re-dissolved in 100 g of THF. This solution was then poured into a mixed solution of 250 g of acetone and 250 g of methanol, once again effecting re-precipitation. The precipitate was collected by filtration, then dried in vacuo at 130° C. for 6 hours, yielding 5.5 g of the highly branched polymer PTPA-PBA having the repeating units shown in formula (A) below.

The polystyrene-equivalent weight-average molecular weight Mw of PTPA-PBA, as measured by GPC, was 5,400, and the polydispersity Mw/Mn was 1.89 (here, "Mn" stands for the number-average molecular weight measured under the same conditions).

[Chemical Formula 7]

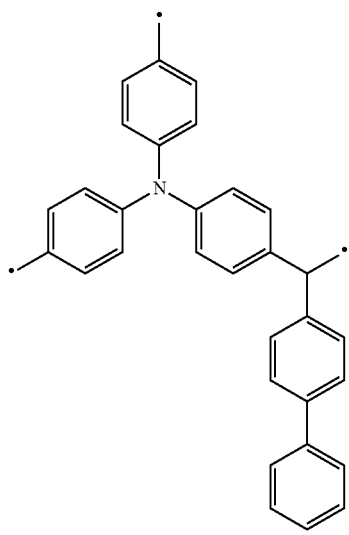

[A]

Example 1

Production of Photoacid Generator-Containing Conductive Composition and Conductive Composite (1)
Production of Conductive Composition:

First, 50 mg of the PTPA-PBA synthesized in Synthesis Example 1 as the dispersant was dissolved in 50 g of NMP, following which 50 mg of CNT-1 as the SWCNTs was added to the solution. The resulting mixture was subjected to 10 minutes of ultrasonic treatment at room temperature (about 25° C.) using a probe-type sonicator. The treated mixture was left at rest overnight at room temperature (about 25° C.), then centrifuged for 1 hour at 10,000 g and room temperature (about 25° C.). The black supernatant that formed was then collected as a SWCNT-containing dispersion.

To 8 g of this SWCNT-containing dispersion was added 8 mg of the photoacid generator CPI as a dopant precursor and 2 g of CHN as a wetting agent, thereby forming a conductive composition. This composition was left at rest overnight at room temperature (about 25° C.), following which it was again centrifuged for 1 hour at 10,000 g and room temperature (about 25° C.), thereby giving, in the form of a black supernatant, a conductive composition for use as a coating fluid.

Next, 1 g of this coating fluid was diluted with 4.94 g of NMP, and the UV-visible-near IR absorption spectrum was measured using a glass cell having an optical path length of 1 mm, whereupon absorption was clearly observed in the semiconducting $S_{11}$ band (1,400 to 1,000 nm) and $S_{22}$ band (1,000 to 600 nm) and in the metallic band (600 to 450 nm), confirming that the SWCNTs were dispersed to an individually dispersed state. The light absorbance at a wavelength of 400 nm is shown in Table 1.
Production of Conductive Composite:

The coating fluid produced as described above was spray-coated with an airbrush for 15 to 20 seconds over the entire top surface of a glass substrate (5 cm×5 cm×1 mm, available from Toshinriko) heated on a 230° C. hot plate, thereby producing a uniform electrically conductive composite thin-film. Spraying was carried out using nitrogen at a pressure of 0.2 MPa from about 20 cm above the substrate to be coated. Next, using a spot light source, the resulting conductive composite thin-film was irradiated with light at a dose of 10 mW/cm² (365 nm basis) for 10 minutes.

The surface resistivity and the total light transmittance of the conductive composite thin-film, both before and after irradiation, are shown in Table 1. The total light transmittance was calculated as follows: (total light transmittance of conductive composite including the base material)+(total light transmittance of base material).

Example 2

Production of Photoacid Generator-Containing Conductive Composition and Conductive Composite (2)

Aside from changing the dopant to 8 mg of the photoacid generator PI, preparation of a conductive composition, production of a conductive composite and evaluation were carried out in the same way as in Example 1. The results are shown in Table 1.

The UV-visible-near IR absorption spectrum for the resulting conductive composition coating fluid was measured in the same way as in Example 1, from which the SWCNTs were confirmed to be dispersed in an individually dispersed state.

Example 3

Production of Thermal Acid Generator-Containing Conductive Composition and Conductive Composite (1)

Aside from changing the dopant to 8 mg of the thermal acid generator PTSA-CH and not carrying out light irradiation, preparation of a conductive composition, production of a conductive composite and evaluation were carried out in the same way as in Example 1. The results are shown in Table 1.

The UV-visible-near IR absorption spectrum for the resulting conductive composition coating fluid was measured in the same way as in Example 1, from which the SWCNTs were confirmed to be dispersed in an individually dispersed state.

Comparative Example 1

Production of Acid Generator-Free Conductive Composition and Conductive Composite (1)

Aside from not adding a dopant precursor, preparation of a conductive composition, production of a conductive composite and evaluation were carried out in the same way as in Example 1. The results are shown in Table 1.

The UV-visible-near IR absorption spectrum for the resulting conductive composition coating fluid was measured in the same way as in Example 1, from which the SWCNTs were confirmed to be dispersed in an individually dispersed state.

Comparative Example 2

Production of Organic Acid-Containing Conductive Composition and Conductive Composite (1)

Aside from changing the dopant precursor to 8 mg of the organic acid PTSA (dopant), preparation of a conductive composition, production of a conductive composite and evaluation were carried out in the same way as in Example 1. The results are shown in Table 1.

The UV-visible-near IR absorption spectrum for the resulting conductive composition coating fluid was measured in the same way as in Example 1, whereupon the light absorbances within the measurement wavelength region were all zero. It was confirmed from this that the SWCNTs were unable to stably disperse within the conductive composition and formed aggregates, as a result of which they were removed by centrifugal separation.

As shown in Table 1, the thin-films obtained from the CNT dispersions in Examples 1 to 3 in which dopant precursors were used had low surface resistivities compared with the dopant precursor-free Comparative Example 1, and so a conductivity-improving effect is observed.

That is, in Example 1 in which a photoacid generator was used, the surface resistivity following irradiation with light decreased about one order of magnitude, from which it is evident that a conductivity-improving effect due to doping is exhibited.

Also, because the photoacid generator used in Example 2 has a relatively low heat-resistance temperature, it is thought that the photoacid generator can serve as a thermal acid generator, and thereby acid is generated by heat during spray coating. Although a decrease in surface resistivity is not observed following irradiation with light, doping due to the influence of heat elicits a conductivity-increasing effect of the same order as in Example 1.

Even in Example 3 in which a thermal acid generator was used, it can be seen that a conductivity-improving effect of the same order as in Example 1 appears due to doping from the influence of heat during spray coating.

In Comparative Example 2 in which an organic acid dopant was used, a stable CNT dispersion cannot be prepared, as a result of which a conductive composite has not been obtained.

In Example 2, although some increase in the surface resistivity is apparent after irradiation with light, relative to before irradiation, because the same tendency is seen also in Comparative Example 1, this is presumed to be the result of CNT deterioration due to irradiation.

Example 4

Production of Photoacid Generator-Containing Conductive Composition and Conductive Composite (3)

First, 20 mg of the PTPA-PBA synthesized in Synthesis Example 1 as the dispersant was dissolved in 50 g of NMP, following which 10 mg of CNT-2 as the SWCNTs was added to the solution. Using a wet jet mill, the resulting mixture was subjected to dispersion treatment (20 passes) at room temperature (about 25° C.) and 50 MPa. The treated mixture was left at rest overnight at room temperature (about 25° C.), then centrifuged for 1 hour at 10,000 g and room temperature (about 25° C.). The black supernatant that formed was then collected as a SWCNT-containing dispersion.

To 8 g of this SWCNT-containing dispersion was added 8 mg of the photoacid generator CPI as a dopant precursor and 2 g of NMP, thereby forming a conductive composition. This

TABLE 1

| | Dopant precursor | Absorbance (400 nm) | Surface resistivity ($\Omega/\square$) | | Total light transmittance (%) | |
|---|---|---|---|---|---|---|
| | | | Before irradiation | After irradiation | Before irradiation | After irradiation |
| Example 1 | CPI (photoacid generator) | 0.27 | $1.5 \times 10^4$ | $3.3 \times 10^3$ | 86 | 85 |
| Example 2 | PI (photoacid generator) | 0.26 | $3.7 \times 10^3$ | $4.6 \times 10^3$ | 84 | 84 |
| Example 3 | PTSA-CH (thermal acid generator) | 0.31 | $1.9 \times 10^3$ | — | 81 | — |
| Comparative Example 1 | none | 0.28 | $9.7 \times 10^3$ | $1.5 \times 10^4$ | 89 | 89 |
| Comparative Example 2 | PTSA (dopant) | 0.00 | $>10^7$ | $>10^7$ | 100 | 100 | composition was left at rest overnight at room temperature (about 25° C.), following which it was again centrifuged for 1 hour at 10,000 g and room temperature (about 25° C.), thereby giving, as a black supernatant, a conductive composition for use as a coating fluid.

The UV-visible-near IR absorption spectrum of this coating fluid was measured using a glass cell having an optical path length of 1 mm, whereupon absorption was clearly observed in the semiconducting $S_{11}$ and $S_{22}$ bands and in the metallic band, confirming that the SWCNTs were dispersed to an individually dispersed state. The light absorbance at a wavelength of 400 nm is shown in Table 2.

Using the coating fluid prepared above, a conductive composite thin-film was produced and evaluated in the same way as in Example 1. The results are shown in Table 2.

Example 5

Production of Thermal Acid Generator-Containing Conductive Composition and Conductive Composite (2)

Aside from changing the dopant to 8 mg of the thermal acid generator PTSA-CH and not carrying out light irradiation, preparation of a conductive composition, production of a conductive composite and evaluation were carried out in the same way as in Example 4. The results are shown in Table 2.

The UV-visible-near IR absorption spectrum for the resulting conductive composition coating fluid was measured in the same way as in Example 4, from which the SWCNTs were confirmed to be dispersed in an individually dispersed state.

Comparative Example 3

Production of Acid Generator-Free Conductive Composition and Conductive Composite (2)

Aside from not adding a dopant precursor, preparation of a conductive composition, production of a conductive composite and evaluation were carried out in the same way as in Example 4. The results are shown in Table 2.

The UV-visible-near IR absorption spectrum for the resulting conductive composition coating fluid was measured in the same way as in Example 4, from which the SWCNTs were confirmed to be dispersed in an individually dispersed state.

Comparative Example 4

Production of Organic Acid-Containing Conductive Composition and Conductive Composite (2)

Aside from changing the dopant precursor to 8 mg of the organic acid PTSA (dopant), preparation of a conductive composition, production of a conductive composite and evaluation were carried out in the same way as in Example 4. The results are shown in Table 2.

The UV-visible-near IR absorption spectrum for the resulting conductive composition coating fluid was measured in the same way as in Example 4, whereupon the light absorbance was less than one-half of those for the conductive composition coating fluid obtained in Examples 4 and 5 and in Comparative Example 3. It was confirmed from this that the SWCNTs did not stably disperse within the conductive composition.

TABLE 2

| | Dopant precursor | Absorbance (400 nm) | Surface resistivity ($\Omega/\square$) | | Total light transmittance (%) | |
|---|---|---|---|---|---|---|
| | | | Before irradiation | After irradiation | Before irradiation | After irradiation |
| Example 4 | CPI (photoacid generator) | 0.52 | $3.0 \times 10^5$ | $1.1 \times 10^5$ | 98 | 98 |
| Example 5 | PTSA-CH (thermal acid generator) | 0.51 | $7.4 \times 10^4$ | — | 96 | — |
| Comparative Example 3 | none | 0.51 | $3.1 \times 10^5$ | $3.7 \times 10^5$ | 97 | 97 |
| Comparative Example 4 | PTSA (dopant) | 0.21 | $7.5 \times 10^4$ | $1.3 \times 10^5$ | 98 | 98 |

As shown in Table 2, the thin-films obtained from the CNT dispersions in Examples 4 and 5 in which dopant precursors were used had low surface resistivities compared with the dopant precursor-free Comparative Example 3, and thus exhibited a conductivity-improving effect.

That is, in Example 4 in which a photoacid generator was used, the surface resistivity following light irradiation decreased to about ⅓ the level before irradiation, indicating a conductivity-improving effect due to doping.

Even in Example 5 in which a thermal acid generator was used, it is apparent that a conductivity-improving effect at least as large as that in Example 4 occurred due to doping under the influence of heat during spray coating.

In Comparative Example 4 in which an organic acid dopant was used, a stable CNT dispersion could not be prepared, as a result of which a large amount of CNT was removed by centrifugal separation.

The invention claimed is:
1. An electrically conductive composition characterized by comprising carbon nanotubes, a carbon nanotube dispersant, and a dopant precursor,
wherein:
the dispersant is a non-conjugated highly branched polymer having repeating units of formula (1) or formula (2) below

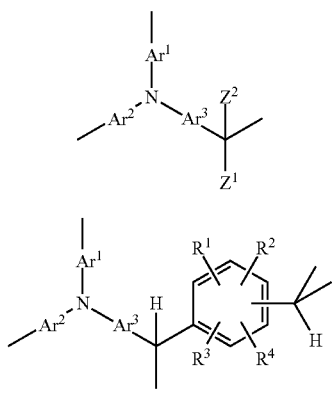

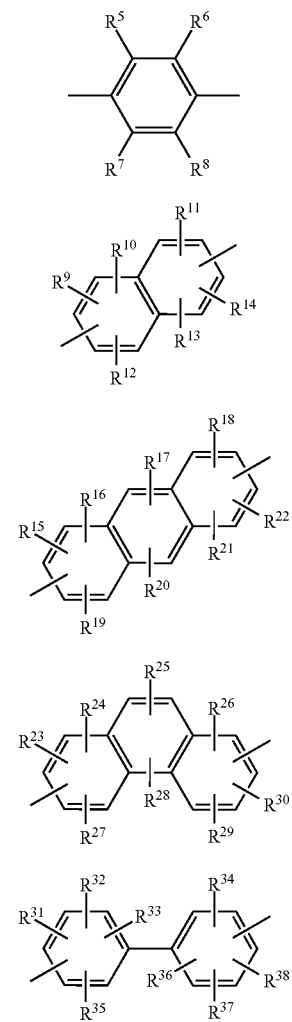

wherein Ar¹ to Ar³ are each independently a divalent organic group of any one of formulas (3) to (7) below in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof; $Z^1$ and $Z^2$ in formula (1) are each independently a hydrogen atom, an alkyl group of 1 to 5 carbons which may have a branched structure, or a monovalent organic group of any one of formulas (8) to (11) below

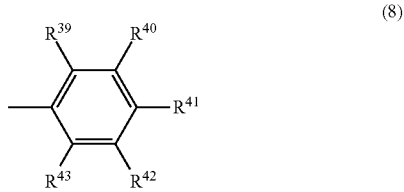

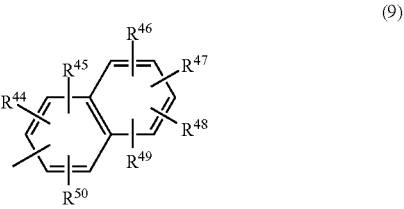

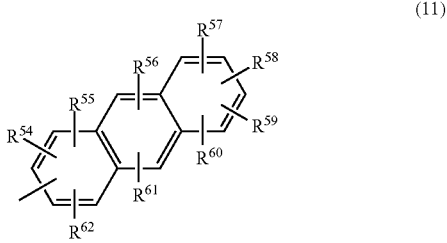

in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $COOR^{63}$, or $NR^{63}R^{64}$, with $R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group, or a carboxyl group, sulfo group, phosphoric acid group, phosphonic acid group or salt of any thereof, with the proviso that $Z^1$ and $Z^2$ are not both alkyl groups; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof; and the dopant precursor is an acid generator which generates cations under the influence of light and/or heat.

2. The electrically conductive composition according to claim 1, wherein the polymer compound has a polystyrene-equivalent weight-average molecular weight, as measured by gel permeation chromatography, of from 1,000 to 2,000,000.

3. The electrically conductive composition according to claim 1 or 2, which further comprises an organic solvent.

4. The electrically conductive composition according to claim 1, wherein $Ar^1$ to $Ar^3$ are the divalent organic group of formula (3).

5. The electrically conductive composition according to claim 1, wherein $Z^1$ and $Z^2$ in formula (1) are each independently the hydrogen atom or the monovalent organic group of formula (8).

6. An electrically conductive composite obtained from the conductive composition according to claim 1 or 2.

7. The electrically conductive composite of claim 6 which is a thin-film.

8. A method of producing an electrically conductive composite, the method being characterized by the step of subjecting the electrically conductive composition of claim 1 or 2 to light irradiation and/or heat application.

* * * * *